United States Patent
Obiols

(10) Patent No.: US 9,016,259 B2
(45) Date of Patent: Apr. 28, 2015

(54) PROCESS FOR CONTROLLING THE COMBUSTION OF AN INTERNAL COMBUSTION ENGINE WITH GASOLINE DIRECT INJECTION, IN PARTICULAR WITH CONTROLLED IGNITION

(75) Inventor: Jérôme Obiols, Feyzin (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 350 days.

(21) Appl. No.: 13/615,801

(22) Filed: Sep. 14, 2012

(65) Prior Publication Data

US 2013/0074800 A1    Mar. 28, 2013

(30) Foreign Application Priority Data

Sep. 22, 2011  (FR) ..................... 11 02884

(51) Int. Cl.
  *F02M 21/02*  (2006.01)
  *F02D 19/06*  (2006.01)
  *F02D 41/14*  (2006.01)
  *F02D 19/08*  (2006.01)
  *F02D 41/00*  (2006.01)

(52) U.S. Cl.
  CPC ............ *F02D 19/06* (2013.01); *F02D 41/1466* (2013.01); *F02D 19/08* (2013.01); *F02D 41/0025* (2013.01); *F02D 41/0027* (2013.01); *Y02T 10/36* (2013.01)

(58) Field of Classification Search
  CPC ....... F02D 19/06; F02D 19/08; F02D 19/105; F02D 41/0025; F02D 41/0027; F02D 41/0295; F02D 41/064; F02D 41/1454; F02D 41/1466

USPC ............ 123/27 GE, 525, 299, 300, 431, 575, 123/576, 577, 578, 436, 491, 492; 701/103, 701/104, 109, 113
See application file for complete search history.

(56) References Cited

U.S. PATENT DOCUMENTS

| 7,111,452 | B2 * | 9/2006 | Miyoshi et al. .................. 60/285 |
| 7,568,452 | B2 * | 8/2009 | Shimada et al. .................. 123/3 |
| 8,127,750 | B2 * | 3/2012 | Klein et al. ..................... 123/575 |
| 2007/0039588 | A1 * | 2/2007 | Kobayashi ..................... 123/304 |

FOREIGN PATENT DOCUMENTS

| DE | 10 2006 025 259 A1 | 12/2007 | |
| DE | 10 2008 016 376 A1 | 1/2009 | |
| EP | 2551497 | * 1/2013 | ............. F02D 19/08 |
| WO | WO 2010/139875 A1 | 12/2010 | |

* cited by examiner

*Primary Examiner* — Hai Huynh
(74) *Attorney, Agent, or Firm* — Antonelli, Terry, Stout & Kraus, LLP.

(57) ABSTRACT

A process controls the combustion of an internal combustion engine with controlled ignition and liquid fuel direct injection. The engine includes at least one cylinder with a combustion chamber, at least one intake, at least one exhaust and at least one direct injector for liquid fuel in order to obtain a fuel/air mixture in the combustion chamber.
The process includes determining the operational zone of the engine in which particulates are emitted during combustion of the fuel/air mixture and, for operation of the engine in this determined zone, introducing into the combustion chamber another fuel/air mixture resulting from indirect injection of a gaseous fuel.

18 Claims, 1 Drawing Sheet

Figure 1:
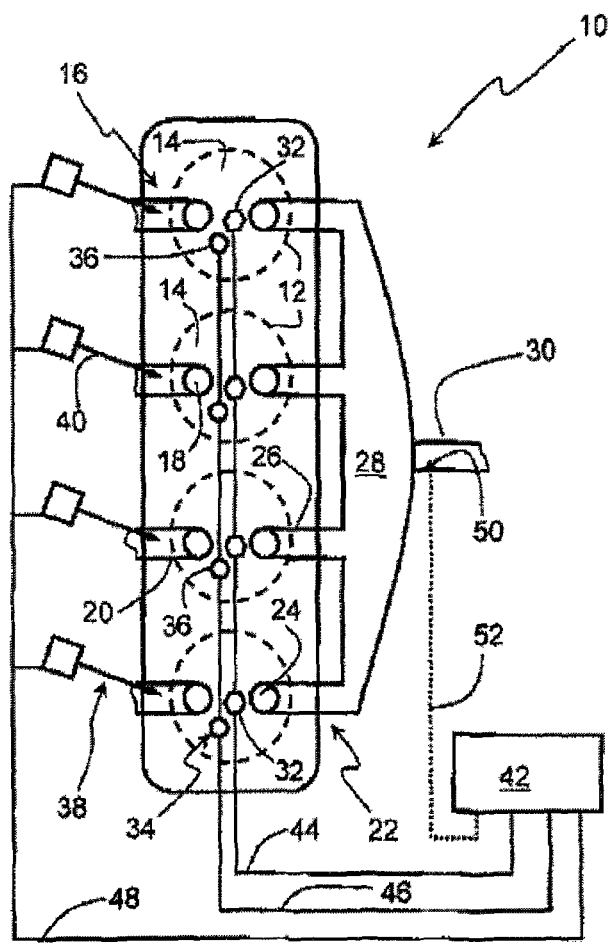

PROCESS FOR CONTROLLING THE COMBUSTION OF AN INTERNAL COMBUSTION ENGINE WITH GASOLINE DIRECT INJECTION, IN PARTICULAR WITH CONTROLLED IGNITION

FIELD OF THE INVENTION

The present invention relates to a process for controlling the combustion of a gasoline direct injection internal combustion engine.

More particularly, it is applicable to such an engine wherein ignition of the fuel/air mixture contained in the combustion chamber is carried out by controlled ignition, such as with a spark plug.

It is also applicable to a controlled auto-ignition combustion engine, known as a CAI engine, in which ignition of the fuel/air mixture results from heat released by compression of that fuel/air mixture.

As is widely known, the exhaust gases from a gasoline direct injection engine contains many pollutants, in particular particulates.

Those particulates are harmful to the environment and may cause problems to human health. As a result, such particulate emissions will be greatly reduced in future regulations for combatting pollution.

In order to limit those particulate emissions, and as is better described in patent application JP 2000/303878, a method is provided that uses a particulate filter placed on the exhaust line of a direct injection internal combustion engine and that can control combustion of the fuel/air mixture in the combustion chamber of the engine in order to increase the concentration of oxygen in the exhaust gases.

That increase in oxygen then means that combustion of almost all of the particulates trapped in the particulate filter can be carried out. At the outlet of that filter, the exhaust gases contain only an infinitesimal quantity of particulates.

Although satisfactory, that method suffers from not inconsiderable drawbacks.

In fact, in order to be able to minimize particulate emissions, the exhaust line of the engine comprises a particulate filter, generally in the form of a ceramic block provided with longitudinal, parallel channels, which is expensive and complicated in design. In addition, modifying the combustion parameters in order to have oxygen in the exhaust disturbs the course of that combustion, which has repercussions on the performance of that engine. Further, introducing oxygen into the exhaust line may result in post-combustion of unburned hydrocarbons (HC) contained in the exhaust gas, with a risk of damage to that line.

Alternative solutions to using a particulate filter are also known which consist in reducing the emissions of particulates at the source, such as by multi-injection or increasing the fuel injection pressures.

These solutions have the respective disadvantages of requiring more powerful control software (power stage) and of generating an increase in losses by friction in the engine which are linked to the operation of the high pressure pump used to inject the fuel.

The present invention aims to overcome the above disadvantages by means of a process that can greatly limit the production of particulates without necessitating the presence of a particulate filter on the exhaust line while not modifying the operation of the engine.

To this end, the present invention concerns a process for controlling the combustion of an internal combustion engine with controlled ignition and liquid fuel direct injection in which the engine comprises at least one cylinder with a combustion chamber, at least one intake means, at least one exhaust means and at least one direct injection means for liquid fuel in order to obtain a fuel/air mixture in the combustion chamber, characterized in that it consists in:

determining at least one operational zone of the engine in which particulates are emitted during combustion of the fuel/air mixture;

for operation of the engine in this determined zone, introducing into the combustion chamber another fuel/air mixture resulting from indirect injection of a gaseous fuel.

The process may consist in obtaining the fuel/air mixture from a gasoline liquid fuel.

The process may consist in introducing a gaseous fuel of the natural vehicle gas (NVG) type.

The process may consist in introducing a gaseous fuel of the liquid petroleum gas (LPG) type.

The process may consist in determining the at least one operational zone from tests and in storing the parameters for that zone in the engine control unit.

The process may consist in determining the at least one operational zone from a measurement carried out by a particulate sensor.

The process may consist in placing the sensor in the exhaust manifold connected to said exhaust means.

The process may consist in placing the sensor in the exhaust line of the engine.

Figure 2:
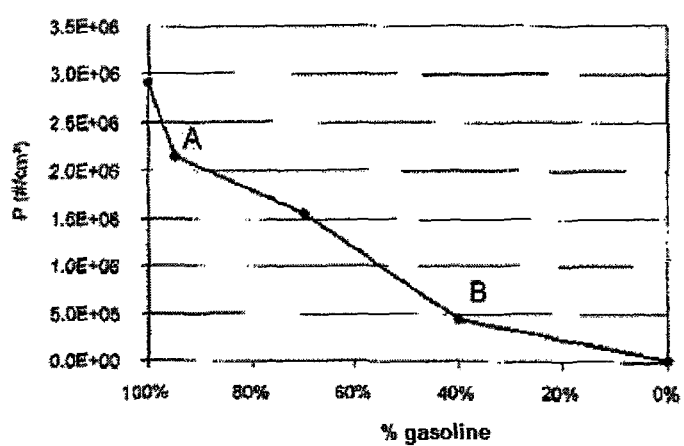

Further characteristics and advantages of the invention will become apparent from the following description, given by way of illustration only and not by way of limitation, with reference to the accompanying drawings in which:

FIG. 1 shows an engine using the process for controlling the combustion phase of the invention; and FIG. 2 illustrates a graph showing the change in the reduction in concentration of particulates P of the exhaust gases (number of particulates (#)/cubic centimeters ($cm^3$) as a function of the percentage of gasoline) using the process of the invention.

The engine 10 illustrated in FIG. 1 by way of example is an internal combustion engine of the gasoline direct injection type with controlled ignition.

This engine can operate in a first combustion mode known as a mono-fuel mode in which a single fuel is used, or in another combustion mode known as a multi-fuel mode which can be used to associate several fuels of different kinds.

By way of non-limiting example, the fuel used for mono-fuel operation is a liquid fuel, in this case of the gasoline type, but any other type of liquid fuel such as ethanol or a biofuel may be used. For multi-fuel operation, another gaseous fuel such as NVG (natural vehicle gas) or LPG (liquefied petroleum gas) or a biogas is associated with this liquid fuel.

In order to simplify the following description, mention will be made of a gasoline type liquid fuel for mono-fuel operation and for multi-fuel operation, in this case bi-fuel operation, this gasoline type liquid fuel is associated with a gaseous NVG type fuel.

The engine illustrated in FIG. 1 comprises at least one cylinder 12, in this case four cylinders, inside which a piston (not shown) is displaced in an alternative rectilinear movement. This piston and the cylinder head zone (not shown) opposite it can thus define a combustion chamber 14 in which combustion of a fuel/air mixture occurs.

The cylinder comprises air intake means 16 with at least one intake valve 18 associated with intake pipework 20 and means for exhausting burned gases 22 with at least one exhaust valve 24 controlling exhaust pipework 26.

The exhaust pipework 26 is connected to an exhaust manifold 28 which itself is connected to an exhaust line 30.

Clearly, and without departing from the scope of the invention, a forced induction device (not shown) may be placed on this exhaust line.

Advantageously, this device may be a turbocharger with a turbine, wherein exhaust gases flowing in the exhaust line 30 pass through the turbine, and a compressor rotationally linked with this turbine so as to compress external air and admit that pressurized air (or supercharged air) into the intake pipework 20.

This cylinder also comprises controlled ignition means 32 such as a spark plug which can generate one or more sparks that can ignite the fuel/air mixture present in the combustion chamber 14 of the cylinder 12.

This cylinder also comprises first means 34 for supplying fuel to the engine, known as the direct supply means. This direct supply means essentially comprises a liquid gasoline type fuel injector 36 facing the combustion chamber and which can be used to introduce fuel directly into this chamber.

This cylinder also comprises second fuel supply means 38, known as the indirect supply means, which comprises a gaseous NVG type fuel injector 40 to inject this gaseous fuel into the intake pipework 20.

The engine is associated with an engine control unit 42 which can control the operation of this engine.

More particularly, this engine control unit is connected directly or indirectly via conductors to various sensors, probes and/or detection means (water temperature, oil temperature, pressure in the combustion chamber, etc.) comprised in the engine. The signals received are processed and the engine control unit then controls the means of this engine via control lines to ensure that it operates properly.

Thus, the engine control unit controls in particular the plugs via a control line 44, the injectors 36 of the direct supply means via a line 46 and the injectors 38 of the indirect supply means via a line 48.

This engine control unit also contains maps or data tables which can be used to estimate the parameters necessary for its operation.

This engine control unit also contains tables recording the operational zones of the engine which are conducive to the formation of particulates. These tables essentially result from series of tests carried out on that type of engine.

These tests highlighted that these zones correspond to those of cold operation of the engine and/or operation under high engine loads.

For cold operation, it is assumed that this type of operation corresponds to that in which the liquids used for the operation of the engine, such as the lubricant oil and/or coolant, are at a temperature of below approximately 30° C.

Regarding high load operation, the engine operates with a mean effective pressure (MEP) of more than 10 bars.

In these operational zones of the engine, particulate formation results from heterogeneities in the mixture of air and fuel, more particularly when there are zones in the mixture which are very rich, i.e. where the fuel is not completely mixed with the air.

Thus, during cold operation, the gasoline tends not to vaporize properly and tends to deposit on the walls of the cylinder or the piston. This liquid gasoline will then form soot as the flame passes.

For high load operation, the quantities of gasoline injected are high and the formation of zones of the fuel/air mixture where the richness is locally very high is increased.

As a consequence, when this engine operates in one of the two zones cited above, the engine control unit modifies the injection parameters to limit particulate emissions. To this end, the operation of the engine changes from mono-fuel combustion to multi-fuel combustion.

Starting from conventional mono-fuel operation of the engine with direct injection of gasoline into the combustion chamber and formation of a fuel/air mixture inside it, the engine control unit controls the fuel supply means such that the fuel/air mixture contained in the combustion chamber 14 comprises a gasoline fuel portion and a NVG fuel portion.

The proportion of each fuel is determined by a map contained in the engine control unit. This map can be used to adjust the proportion of gasoline with respect to the NVG as a function of a target particulate emission that should not be exceeded. By way of example, this target may be derived from an anti-pollution regulation.

More precisely, the engine control unit controls the liquid fuel injector 36 via the line 46 such that the quantity of gasoline introduced into the combustion chamber 14 is reduced compared with conventional operation. At the same time, this engine control unit controls the gaseous fuel injector 38 via the line 48 so that it injects NVG into the intake pipework 20 so as to obtain a fuel/air mixture which is then introduced into the combustion chamber when the intake valve 18 opens.

This fuel/air mixture based on gaseous fuel mixes with the fuel/air mixture based on gasoline already contained in the combustion chamber to obtain a quasi-homogeneous overall fuel/air mixture.

Once this overall mixture has been obtained, the engine control unit controls the spark plug 32 near the end of the compression phase of the engine, to ignite this fuel/air mixture.

Because of the indirect injection of a quantity of gaseous fuel, homogenization of the overall mixture of the two fuels is greatly improved and as a result, the number and size of the emitted particulates are substantially reduced.

By way of example, reference should be made to FIG. 2, which illustrates the result of a test showing the concentration of particulates contained in the exhaust gases from an engine using the process of the invention.

For this test, the engine operated using a gasoline liquid fuel as well as a gaseous NVG fuel with an operating point of 1500 rpm, a MEP of 3 bars and a temperature of 20° C. for the water and oil.

As can clearly be seen in the figure, it is possible to reduce the concentration of emitted particulates by approximately 25% with a fuel/air mixture containing a fraction by weight of gasoline of approximately 95% and a fraction by weight of NVG of 5% (point A). By using a fuel/air mixture with a fraction by weight of gasoline of approximately 40% and a fraction by weight of NVG of approximately 60% (point B), more than 80% of the concentration of emitted particulates can be reduced. In all of the multi-fuel operational cases, the performance of the engine was not fundamentally changed.

Furthermore, this multi-fuel operational mode enables a reduction in the quantity of particulates with the largest sizes.

In a variation, the engine may comprise a particulate sensor 50 placed in the exhaust line 30 or in the exhaust manifold 28 and which is connected to the engine control unit 42 via a conductor 52.

This engine control unit can thus be used to determine, from information transmitted by the sensor, the operational zones of the engine which are conducive to the formation of particulates.

From this, the engine control unit will control the fuel supply means 34 and 38 either in mono-fuel mode for the operational zones where the particulate emissions are low or almost non-existent, or in multi-fuel mode for the zones which are conducive to formation of these particulates.

The invention claimed is:

1. A control process for controlling the combustion of an internal combustion engine with controlled ignition and liquid fuel direct injection, in which the engine comprises at least one cylinder with a combustion chamber, at least one intake means, at least one exhaust means and at least one direct injection means for liquid fuel in order to obtain a fuel/air mixture in the combustion chamber, the control process comprising:

determining at least one operational zone of the engine in which particulates are emitted during combustion of the fuel/air mixture; and for operation of the engine in this determined zone, introducing into the combustion chamber another fuel/air mixture resulting from indirect injection of a gaseous fuel comprising natural vehicle gas (NVG) or liquid petroleum gas (LPG).

2. The control process according to claim 1, wherein the fuel/air mixture is obtained from a liquid gasoline fuel.

3. The control process according to claim 2, wherein the gaseous fuel comprises natural vehicle gas (NVG).

4. The control process according to claim 2, wherein the gaseous fuel comprises liquid petroleum gas (LPG).

5. The control process according to claim 1, wherein the gaseous fuel comprises natural vehicle gas (NVG).

6. The control process according to claim 1, wherein the gaseous fuel comprises liquid petroleum gas (LPG).

7. The control process according to claim 1, wherein determining the at least one operational zone comprises determining at least one operational zone from tests and storing the parameters for the at least one operational zone in an engine control unit.

8. The control process according to claim 1, wherein determining the at least one operational zone comprises determining at least one operational zone from a measurement carried out by a particulate sensor.

9. The control process according to claim 8, wherein the particulate sensor is provided in an exhaust line of the engine.

10. The control process according to claim 8, wherein the particulate sensor is provided in an exhaust manifold connected to the exhaust means.

11. A control process for controlling the combustion of an internal combustion engine with controlled ignition and liquid fuel direct injection, in which the engine comprises at least one cylinder with a combustion chamber, at least one intake comprising intake pipework and an intake valve, at least one exhaust and at least one direct injector for liquid fuel in order to obtain a first fuel/air mixture in the combustion chamber, the control process comprising:

determining if the engine is operated in an operational zone of the engine in which particulates are emitted during combustion of the first fuel/air mixture; and if the engine is being operated in an operational zone of the engine in which particulates would be emitted by combustion of the fuel/air mixture, indirectly injecting into the combustion chamber a gaseous fuel comprising natural vehicle gas (NVG) or liquid petroleum gas (LPG).

12. The control process according to claim 11, wherein the gaseous fuel comprises natural vehicle gas (NVG).

13. The control process according to claim 11, wherein the gaseous fuel comprises liquid petroleum gas (LPG).

14. The control process according to claim 11, wherein determining if the engine is operated in an operational zone of the engine in which particulates are emitted during combustion of the first fuel/air mixture comprises determining if the engine is being operated within parameters stored in an engine control unit, the parameters being determined from tests.

15. The control process according to claim 11, wherein determining the at least one operational zone comprises determining at least one operational zone from a measurement carried out by a particulate sensor.

16. The control process according to claim 15, wherein the particulate sensor is provided in an exhaust line of the engine.

17. The control process according to claim 15, wherein the particulate sensor is provided in an exhaust manifold of the engine.

18. The control process according to claim 11, wherein the engine further comprises an engine control unit and a gaseous fuel injector configured to inject gaseous fuel into the intake pipework so as to obtain a second fuel/air mixture that is then introduced into the combustion chamber when the intake valve opens, and wherein, if the engine is being operated in an operational zone of the engine in which particulates would be emitted by combustion of the fuel/air mixture, the engine control unit controls the at least one direct injector for liquid fuel to reduce a quantity of liquid fuel introduced into the combustion chamber and controls the gaseous fuel injector to inject the gaseous fuel into the intake pipework so as to obtain the second fuel/air mixture that is then introduced into the combustion chamber when the intake valve opens.

* * * * *